United States Patent [19]

Shirato et al.

[11] Patent Number: 5,158,711
[45] Date of Patent: Oct. 27, 1992

[54] INSOLUBLE TANNIN PREPARATION PROCESS, WASTE TREATMENT PROCESS EMPLOYING INSOLUBLE TANNIN AND ADSORPTION PROCESS USING TANNIN

[75] Inventors: Wataru Shirato; Yoshinobu Kamei, both of Ibaraki, Japan

[73] Assignee: Mitsubishi Nuclear Fuel Co., Tokyo, Japan

[21] Appl. No.: 631,946

[22] Filed: Dec. 21, 1990

[30] Foreign Application Priority Data

Jan. 9, 1990 [JP] Japan ................................. 2-2050
Jan. 9, 1990 [JP] Japan ................................. 2-2051

[51] Int. Cl.$^5$ .............................................. G21F 9/08
[52] U.S. Cl. ................................ 252/631; 252/628; 252/82; 210/681; 210/682; 423/7; 423/139
[58] Field of Search ............... 252/626, 628, 631, 83; 210/681, 682, 679; 423/11, 7, 139

[56] References Cited

U.S. PATENT DOCUMENTS

| | | | |
|---|---|---|---|
| 4,190,463 | 2/1980 | Kaplan | 134/3 |
| 4,558,080 | 12/1985 | Quamme et al. | 524/72 |
| 4,944,812 | 7/1990 | Lindert et al. | 148/251 |
| 4,948,513 | 8/1990 | Mitchell | 210/705 |

OTHER PUBLICATIONS

Database WPIL, accession no. 88-334727 [47], Derwent Publications Ltd. London; & Patent Abstracts of Japan, vol. 13, No. 56 (C-566), Feb. 8, 1989; & JP-A-63 248 491 (Mitsubishi Genshi Nuclear Fuel).
Database WPIL, accession No. 89-217413 [30], Derwent Publications Ltd., London GB; & Patent Abstracts of Japan, vol. 13, No. 417 (C-636), Sep. 14, 1989; & JP-A-1 155 947 (Koji Sakaguchi).
Database WPIL, accession No. 90-079317 [11], Derwent Publications Ltd., London, GB; & Patent Abstracts of Japan, vol. 14, No. 185 (P-1036), Apr. 13, 1990; & JP-A-2 032 299 (Mitsubishi Genshi Nuclear Fuel).
Chemical Abstracts, vol. 109, No. 16, Oct. 17, 1988, p. 540, left-hand col., Abstract No. 137281f, Columbus, Ohio, US; & JP-A-63 61 988 (K. Sakaguchi) Mar. 18, 1988.

*Primary Examiner*—Brooks H. Hunt
*Assistant Examiner*—Ngoclan T. Mai
*Attorney, Agent, or Firm*—Oblon, Spivak, McClelland, Maier & Neustadt

[57] ABSTRACT

There is disclosed an insoluble tannin preparation process, in which a tannin is first dissolved in an aldehyde aqueous solution. Then, ammonia is added to the solution to produce a precipitate, and the resulting precipitate is subjected to aging. The insoluble tannin thus prepared is employed to treat a waste liquid. Furthermore, there is disclosed an adsorption process in which a tannin is first dissolved in a solution containing a material to be adsorbed. Thereafter, an aldehyde is added to the solution to produce a precipitate having tannin as a principal constituent. The material to be adsorbed is adsorbed to this precipitate.

16 Claims, 2 Drawing Sheets

INSOLUBLE TANNIN PREPARATION PROCESS, WASTE TREATMENT PROCESS EMPLOYING INSOLUBLE TANNIN AND ADSORPTION PROCESS USING TANNIN

BACKGROUND OF THE INVENTION

1. Field of the Invention

The present invention relates to an insoluble tannin preparation process, and a waste treatment process employing the insoluble tannin and an adsorption process using a tannin, which are suitably practiced for treating a waste liquid containing nuclear fuel materials, iron ions, and so on.

2. Prior Art

Usually, nuclear fuels such as uranium or thorium remain in the waste liquid drained during the processing of nuclear fuels. An adsorbent which adsorbs the nuclear materials without being dissolved in the waste liquid has been conventionally utilized to treat waste liquid of this kind. Japanese Patent Applications published with Laid-Open Nos. 63-61998 and 1-155947 describe hydrated gel compounds which may be suitably used as the adsorbents.

The prior art hydrated gel compound is manufactured by reacting an aldehyde or an acid such as sulfuric acid or phosphoric acid with persimmon tannin to gel the tannin.

In the preparation process of the hydrated gel compound, however, the persimmon tannin is the only one that can be used to produce the adsorbent for use in the treatment of the above waste liquid. If natural tannin other than the persimmon tannin is used, the tannin cannot be gelled even though aldehyde or acid is reacted therewith. Consequently, the insoluble hydrated gel compound cannot be obtained by the above preparation process.

Furthermore, the conventional treatment process of waste liquid has been carried out using an insoluble adsorbent which has been manufactured beforehand. Therefore, the conventional waste liquid treatment process has been laborious and high in cost.

Moreover, there has also been known another waste liquid treatment process in which nuclear fuel materials such as uranium or thorium are removed by means of flocculation or coprecipitation of iron hydroxide. With this process, however, the resulting precipitates cannot be disposed of since they are noncombustible.

SUMMARY OF THE INVENTION

It is therefore a primary object of the present invention to provide an insoluble tannin preparation process in which an insoluble tannin can be manufactured utilizing tannins other than persimmon tannin.

Another object is to provide a waste treatment process using an insoluble tannin prepared by the above preparation process.

A further object is to provide an adsorption process using a tannin which is efficiently applicable to the treatment of the waste liquid containing nuclear fuel materials or iron ions.

According to a first aspect of the present invention, there is provided a process of manufacturing an insoluble tannin, comprising dissolving a tannin in an aldehyde aqueous solution, adding ammonia to the solution to produce a precipitate, and aging the precipitate.

In the foregoing, the term "insoluble tannin" is used to mean a tannin which is gelled so as to be insoluble to water.

With this process, tannins other than perssimon tannin may be utilized to produce an insoluble precipitated tannin.

According to a second aspect of the invention, the insoluble tannin prepared by the aforesaid preparation process is used as an adsorbent for the waste liquid treatment.

According to a third aspect of the invention, there is provided an adsorption process using a tannin, comprising dissolving the tannin in a solution containing a material to be adsorbed, and adding an aldehyde to the solution to produce a precipitate having the tannin as a principal constituent and adsorbing the material to be adsorbed.

With this process, there is no need to manufacture adsorbents in advance, and the manufacture of the adsorbent and the execution of the adsorption process are carried out at the same time. In addition, after the adsorption treatment, the adsorbent can be easily incinerated without generating any poisonous gases.

DETAILED DESCRIPTION OF THE INVENTION

Figure 1:
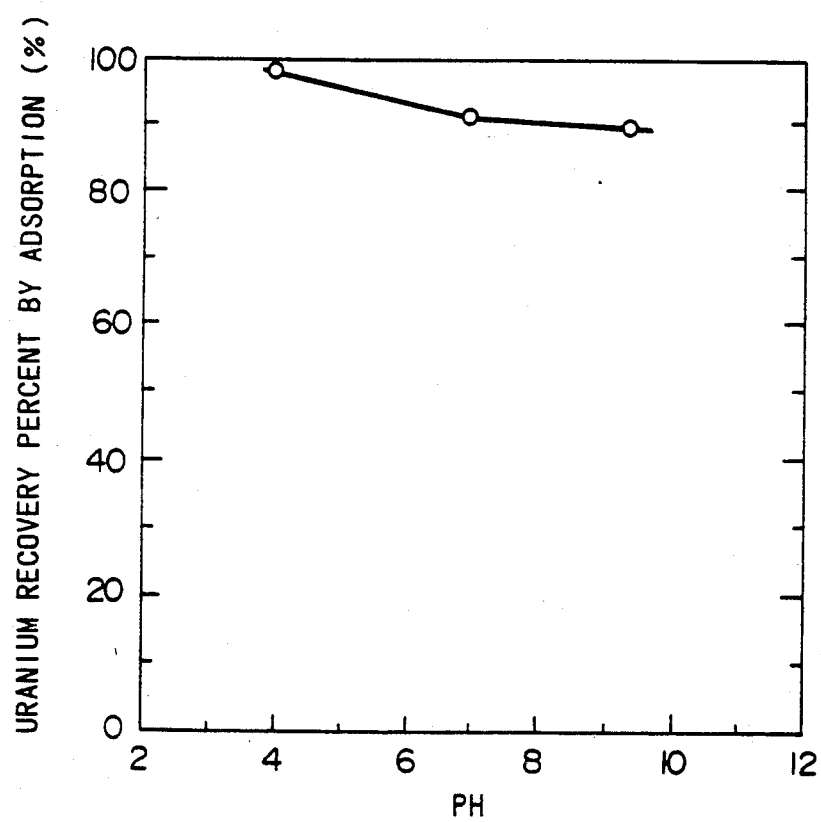
FIG. 1 is a graph showing the relationship between pH of a uranium-containing solution and uranium recovery percent by adsorption in accordance with Example 1.

In the insoluble tannin preparation process in accordance with the present invention, a tannin is first dissolved in an aldehyde aqueous solution. A condensed tannin, such as quebracho tannin, wattle tannin, mangrove tannin, spruce tannin, gambier tannin, acacatechin, and oak bark tannin, is preferably used. In addition, any aldehyde aqueous solution such as a formaldehyde solution, an acetaldehyde solution and a glutaraldehyde solution can be utilized. However, formaldehyde aqueous solution is the most preferable because the rate of formation of precipitates is greatest. Formaldehyde is a material having its content in waste liquid regulated under law. However, it reacts with ammonia, which is added in the subsequent step, to form hexamethylenetetramine, which presents no problem under the waster liquid regulation laws.

It is preferable that the aldehyde concentration in the aldehyde aqueous solution is no less than 0.02% by weight, and that the amount of the tannin to be added is correspondingly no less than 0.02% by weight. If the aldehyde and tannin concentrations should be both less than 0.02% by weight, the tannin would not be precipitated even when ammonia is added. Therefore, the aldehyde and tannin concentrations should be preferably increased in order to ensure a high yield of the precipitate. However, if these concentrations exceed 40% by weight, a peculiar irritating smell due to aldehyde is increased during the dissolving step of the tannin, thereby degrading the working environment. Therefore, the aldehyde and tannin concentrations may be limited so as to range between 0.02 to 40% by weight.

Thereafter, ammonia is added to the aldehyde aqueous solution containing dissolved tannin, so that precipitate containing tannin as a principal constituent is formed. The amount of the ammonia to be added should be preferably determined so as to completely precipitate the tannin dissolved in the solution. However, even though the amount of ammonia should be insufficient, the insoluble tannin, which is not soluble even in an acid aqueous solution, can be obtained by separating the precipitate by filtration and immersing it in aqueous ammonia at pH of 10.

The precipitate containing tannin as a principal constituent is then subjected to evaporation, filtration, or the like, to remove its water content, and is then left to be aged. When an acid such as nitric acid is added immediately after the formation of the precipitate, the precipitate dissolves therein again. However, this is prevented by the above aging process. The time required for the aging process is just a few minutes in the case where the aging is effected while keeping a good contact with air.

With the aging process, the precipitate turns from greenishbrown to brown, or in some cases, to dark brown. The brown precipitate thus formed is stable and insoluble to water, and does not dissolve even in acid. Therefore, it can be utilized in either alkaline or acidic solutions. Furthermore, the insoluble tannin thus obtained exhibits a superior adsorptivity when used as an adsorbent, and hence can be effectively used for the adsorption of nuclear fuel materials such as uranium or thorium, or iron ions contained in the solution such as waste liquid. For effecting the adsorption using the insoluble tannin, a batch process or a column process may be employed.

As described above, in the process of manufacturing an insoluble tannin in accordance with the invention, many tannins occurring in nature can be utilized, so that it becomes possible to make good use of natural resources. In particular, inasmuch as the tannin can be procured at a low cost, the process of the invention is very economical.

Furthermore, according to the present invention, there is also proposed another adsorption process which can be effected without using the insoluble tannin manufactured in advance. More specifically, in the process of the invention, the manufacture of the adsorbent and the execution of the adsorption process are carried out at the same time.

The above adsorption process of the invention is characterized by dissolving a tannin in a solution containing a material to be adsorbed, and adding an aldehyde to the solution and further adding ammonia to the solution to thereby produce a precipitate having the tannin as a principal constituent and adsorbing the material to be adsorbed.

This process may be applied to the adsorption of any material, but may be the most suitable for the waste liquid treatment of nuclear fuel materials such as uranium and thorium, or iron ions. This is because the adsorptivity of the precipitated adsorbent is especially good for such materials.

In this process, the concentration of the material to be adsorbed may be arbitrary. However, it is preferable that it is less than such a value as to make the solution alkaline in order to prevent the material to be adsorbed from precipitating. If the concentration is greater than the above value, a usual filtration process involving adding an alkaline material such as ammonia to a waste liquid should preferably be first applied, and the process of the invention is then applied to the filtrate which has been obtained from the usual filtration process.

Furthermore, the pH of the solution may also be arbitrary. In the case where the solution is strongly acidic, an increased amount of ammonia should be added. However, if an alkaline material such as caustic soda is first added to change the solution to weakly acidic, the amount of ammonia to be added is reduced. In the case where the solution is an alkaline solution which does not contain ammonia, the tannin is first dissolved therein when added. Then, when the aldehyde and ammonia are further added, a precipitate having tannin as a principal constituent is produced. In this connection, if the solution is an alkaline solution which contains ammonia, a precipitate containing tannin as a principal constituent is produced when tannin and aldehyde are added, so that it is not required to add ammonia.

Furthermore, the temperature of the solution may be room temperature. There is no difference in adsorptivity over the temperature range of between 5° and 60° C., so that it is not necessary to heat or cool the solution.

In the process in accordance with the present invention, the tannin as mentioned above is first added to the solution.

Similarly to the process of manufacturing the insoluble tannin, a condensed tannin, such as quebracho tannin, wattle tannin, mangrove tannin, spruce tannin, gambier tannin, acacatechin, and oak bark tannin, is preferably used. The amount of the tannin to be added should be at least 20 mg per 100 ml of the solution in order to ensure the formation of tannin precipitate. If the amount is less than the above value, some undissolved tannin will remain, so that the removability of the material to be adsorbed is adversely affected. On the other hand, the amount of the tannin to be added, with respect to the concentration of the material to be adsorbed, depends on the kind of the material to be adsorbed. When treating the solution containing 85 ppm of uranium as the material to be adsorbed, it is preferable that about 20 to 40 mg of tannin be added per 100 ml of the solution. If the amount added is less than 20 mg, the disadvantage as described above still exists. On the other hand, with the addition of 40 mg of the tannin, a sufficient removability can be ensured. The amount of tannin may be further increased, but the added tannin will remain unreacted.

The solution to which the tannin is added is then agitated as necessary to dissolve the tannin, and then an aldehyde is added.

Similarly to the above-mentioned process of manufacturing the insoluble tannin, any aldehyde such as formaldehyde, acetaldehyde and glutaraldehyde can be utilized. However, formaldehyde aqueous solution is the most preferable due to the same reasons. Furthermore, the amount of aldehyde to be added should be preferably the same as that of tannin.

The solution to which the aldehyde is thus added is agitated as necessary, and then ammonia is added. The amount of ammonia to be added is determined so as to completely precipitate the tannin dissolved in the solution. To give a specific example, when the amount of aldehyde to be added is 1.5 mol, the aldehyde to be added is 1.0 mol. In addition, it is preferable that the pH of the solution after the addition of ammonia is no less than 7. If it is less than 7, some tannin does not precipitate.

With the addition of ammonia, a precipitate having tannin as a principal constituent is formed in the solution. This precipitate is the insoluble tannin which adsorbs the materials to be adsorbed when formed. In addition, in order to promote the sedimentation of the precipitate and facilitate the subsequent step of separation, polyacrylamide may be added to the solution.

Subsequently, the precipitate which has adsorbed the material to be adsorbed is separated by means of filtration or the like, to thereby remove the material to be adsorbed from the solution. The precipitate thus separated is treated by means of incineration or the like.

With the adsorption process as described above, no adsorbents are required to be manufactured in advance, and usual tannins may be directly utilized. Therefore, there is no need to prepare insoluble adsorbents prior to the adsorption process.

In addition, even when the precipitate which has adsorbed the material to be adsorbed is incinerated, no poisonous gas is generated. Therefore, the precipitate can be easily disposed of by incineration.

Furthermore, in the case where the material to be adsorbed is a nuclear fuel material such as uranium or thorium, oxides of a nuclear fuel material such as uranium or thorium remain when the precipitated material is incinerated. Accordingly, it is possible to reuse the precipitate thus incinerated as nuclear fuel materials.

The present invention will be more detailedly described by way of the following examples.

EXAMPLE 1

8 g of wattle tannin powder was dissolved in formaldehyde aqueous solution having 37% by weight of formaldehyde. Then, no less than 14 ml of aqueous ammonia at 13.7N was added to the solution to precipitate a tannin compound. Subsequently, the precipitated tannin thus produced was separated by filtration, and was aged to produce an insoluble tannin.

250 ml of a solution containing 225 ppb of uranium was prepared, and 25 mg (dry weight) of the insoluble tannin prepared as described above was added as an adsorbent. Then, the uranium recoveries were measured for various pH values of the uranium-containing solution. The results are set forth in FIG. 1.

In the foregoing, the recovery $\alpha$ is defined by the following formula:

$$\alpha = \{(C_o - C_t)/C_o\} \times 100 \, (\%)$$

where $C_o$ and $C_t$ denote an initial uranium concentration in the solution and a uranium concentration after the adsorption treatment, respectively.

As will be clearly seen from FIG. 1, the adsorbent composed of the insoluble tannin exhibits a high efficiency for the uranium adsorption in the pH range of between 4 and 9.5.

EXAMPLE 2

100 mg (dry weight) of the insoluble tannin prepared in Example 1 was added as an adsorbent to 250 ml of a solution containing 192.5 ppb of uranium and 14.6 g/l of hydrofluoric acid, and the solution was agitated for about 2 hours to cause the adsorbent to adsorb the uranium. The results are set forth in FIG. 2.

Figure 2:
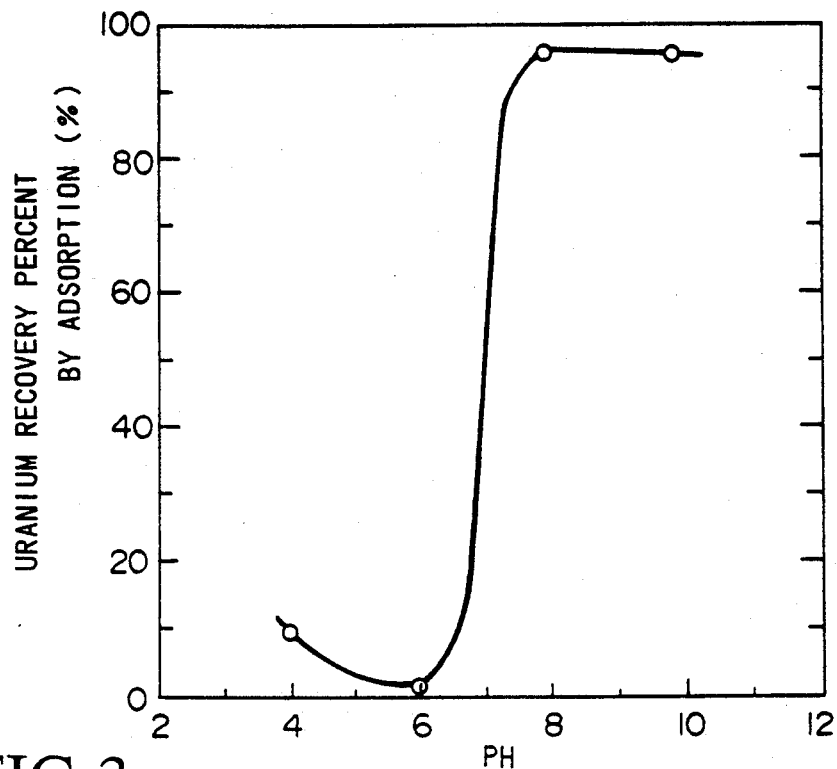
FIG. 2 is a graph similar to FIG. 1, but showing the relationship between pH of a solution containing uranium and hydrofluoric acid and the uranium recovery percent by adsorption in accordance with Example 2.

As seen from FIG. 2, the adsorbent comprised of the insoluble tannin exhibits a high efficiency for uranium adsorption in the alkaline range.

EXAMPLE 3

Figure 3:
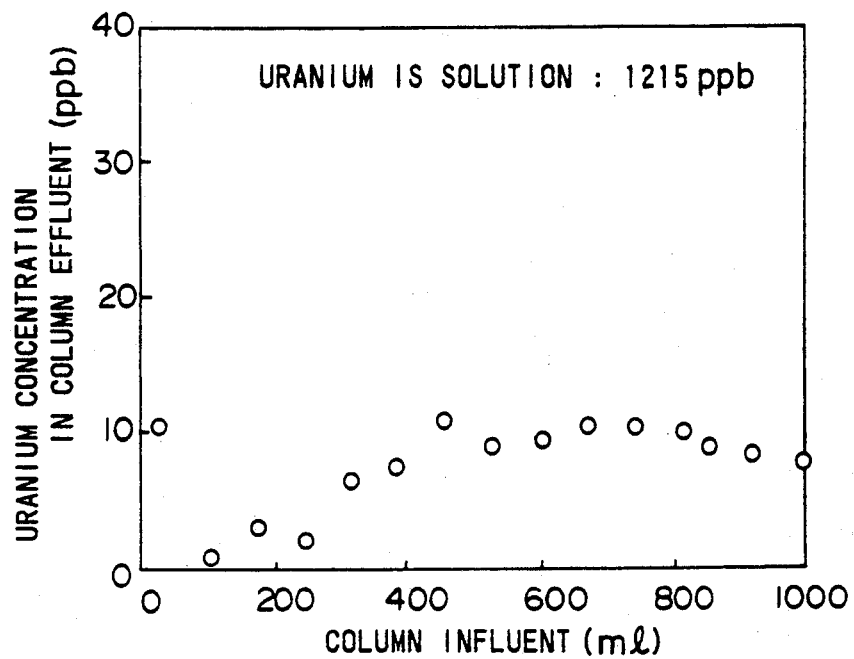
FIG. 3 is a graph showing the relationship between the amount of a column influent and the uranium concentration in a column effluent.

The insoluble tannin prepared in Example 1 was packed into columns of 10 mm inner diameter so as to have a height of 81 mm, and 1.215 ppm of uranium solution (at pH of 10.3) was caused to flow at a space velocity of 17 $h^{-1}$. Then, while causing the uranium solution to flow through the columns, the uranium concentration in the column effluent were measured at prescribed time intervals. The results are shown in FIG. 3. It is understood from the results that the uranium concentrations in the column effluent are all less than 11 ppb, so that the adsorbent exhibits a superior adsorptivity for the uranium adsorption.

EXAMPLE 4

The insoluble tannin as prepared above was packed into the columns in a manner similar to Example 3, and a waste liquid having a thorium concentration of $1.81 \times 10^{-5}$ $\mu Ci/cm^3$ was caused to flow through the columns. Then, after 8 hours, the thorium concentration in the column effluent was $1.51 \times 10^{-6}$ $\mu Ci/cm^3$. Thus, it is confirmed that more than 91% of the thorium was adsorbed on the adsorbent of insoluble tannin.

EXAMPLE 5

200 mg (dry weight) of the insoluble tannin prepared in Example 1 was added as an adsorbent to 1 l of water containing 3.6 ppb of iron ion, and was subjected to contact agitation for one hour. After filtration, iron ion concentration in the filtrate was measured to be 0.4 ppb, and it was confirmed that the amount of adsorption of iron ions per 1 g of insoluble tannin was 16 mg.

EXAMPLE 6

50 ml of a condensed tannin powder was added to 250 ml of waste liquid containing 220 ppb of uranium, and the liquid was agitated to dissolve the tannin. Thereafter, 5 ml of formaldehyde aqueous solution having a concentration of 37% by weight was added, and further aqueous ammonia was gradually added to produce a precipitate having tannin as a principal constituent at pH of no greater than 7. The precipitate thus formed was separated by filtration. Uranium remaining in the filtrate was no greater than 0.4 ppb, and about 100% of removability was attained.

EXAMPLE 7

50 ml of a condensed tannin powder was added to 250 ml of waste liquid having a thorium concentration of $1.81 \times 10^{-5}$ $\mu Ci/cm^3$, and was agitated to dissolve the tannin. Then, 5 ml of formaldehyde aqueous solution containing 37% by weight of formaldehyde was added, and aqueous ammonia was gradually added to produce a precipitate having tannin as a principal constituent at pH of no greater than 7. The precipitate thus formed was separated by filtration. The thorium concentration remaining in the filtrate was no greater than $1.51 \times 10^{-6}$ $\mu Ci/cm^3$, and about 96.9% of removability was attained.

EXAMPLE 8

250 ml of water containing 9.5 ppb of iron ions was treated in a manner similar to Example 6 to produce a precipitate containing tannin as a principal constituent, and the precipitate was separated by filtration. The iron ions contained in the resulting filtrate was 0.04 ppb, and the removability of iron ions was 95.8%.

EXAMPLE 9

A precipitate having tannin as a principal constituent was produced in a manner similar to Example 6, and about 100 ppm of polyacrylamide was added to the waste liquid containing the precipitate therein. With this procedure, the precipitation was promoted, so that the time required for filtration was just 8 minutes, although the filtration time in Example 6 was about 15 minutes. Thus, the filtration time was reduced to about one half the time required in Example 6. In addition, as was the case with Example 6, about 100% of removability of uranium was achieved.

Obviously many modifications and variations of the present invention are possible in the light of the above teachings. It is therefore to be understood that within the scope of the appended claims, the invention may be practiced otherwise than as specifically described.

What is claimed is:

1. An insoluble tannin preparation process comprising dissolving a tannin in an aqueous aldehyde solution, adding ammonia to the solution to produce a precipitate, and aging the precipitate wherein said aging comprises removing water from the precipitate and placing said precipitate in contact with air for a period of time sufficient for the precipitate to become insoluble in both acidic and basic solutions.

2. A process according to claim 1, in which said tannin is a condensed tannin.

3. A process according to claim 2, in which said condensed tannin is selected from the group consisting of quebracho tannin, wattle tannin, mangrove tannin, spruce tannin, gambier tannin, acacatechin, and oak bark tannin.

4. A process according to claim 1, in which said aldehyde aqueous solution is selected from the group consisting of formaldehyde aqueous solution, acetaldehyde aqueous solution and glutaraldehyde aqueous solution.

5. A process according to claim 1, in which said aldehyde solution contains an aldehyde concentration of no less than 0.02% by weight.

6. A process according to claim 5, in which said aldehyde aqueous solution containing the tannin dissolved has a tannin concentration of no less than 0.02% by weight.

7. A process according to claim 5, in which said precipitate is subjected to the aging for a time period of no less than a few minutes.

8. A waste treatment process using an insoluble tannin prepared by the process as defined in claim 1, comprising adding said insoluble tannin to a waste liquid to treat the same.

9. A process according to claim 8, in which said waste liquid contains a nuclear fuel material selected from the group consisting of uranium and thorium, said nuclear fuel material being adsorbed by said insoluble tannin.

10. A process according to claim 8, in which said waste liquid contains an iron ion, said iron ion being adsorbed by said insoluble tannin.

11. An adsorption process using a tannin, comprising dissolving the tannin in a solution containing material to be adsorbed, adding an aldehyde to said solution and further adding ammonia to said solution to thereby produce a precipitate having the tannin as a principal constituent and adsorbing the material to be adsorbed to said precipitate.

12. An adsorption process according to claim 11, in which said material to be adsorbed is a nuclear fuel material selected from the group consisting of uranium and thorium.

13. An adsorption process according to claim 11, in which said material to be adsorbed is an iron ion.

14. An adsorption process according to claim 11, in which the solution containing the material to be adsorbed is a waste liquid containing hydrofluoric acid.

15. An adsorption process according to claim 11, further comprising adding polyacrylamide to the solution after said precipitate is produced, to thereby promote sedimentation of the precipitate.

16. An adsorption process according to claim 11, in which the solution to which said ammonia is added has a pH of no less than 7.

* * * * *